United States Patent [19]

Kihlstedt

[11] 4,205,455
[45] Jun. 3, 1980

[54] METHOD AND AN APPARATUS FOR STEAM CURING AGGLOMERATES

[75] Inventor: Per G. Kihlstedt, Bromma, Sweden

[73] Assignee: Advanced Mineral Research AB, Stockholm, Sweden

[21] Appl. No.: 717,764

[22] Filed: Aug. 26, 1976

[51] Int. Cl.² .............................................. F26B 3/14
[52] U.S. Cl. ........................................ 34/22; 34/34; 34/191; 75/3; 266/185
[58] Field of Search ......... 75/3, 5; 23/313 R, 313 FB; 264/82; 266/185; 34/191, 22, 34

[56] References Cited

U.S. PATENT DOCUMENTS

| Re. 19,757 | 11/1935 | Royster | 75/5 |
| 2,948,521 | 8/1960 | Heiligenstaedy | 75/5 X |
| 3,235,371 | 2/1966 | Volin et al. | 75/3 |
| 3,323,901 | 6/1967 | Dahl et al. | 75/3 |
| 3,877,868 | 4/1975 | Wenzel et al. | 75/3 X |
| 3,972,129 | 8/1976 | Graff | 34/191 X |

FOREIGN PATENT DOCUMENTS

| 470396 | 12/1950 | Canada | 75/3 |
| 609203 | 8/1926 | France | 34/24 |
| 86222 | 4/1936 | Sweden. | |
| 7315108 | 11/1973 | Sweden. | |

OTHER PUBLICATIONS

Ullmann's Encyklopadie der technischen Chemie, 2 Ed., Berlin–Wien, 1930, p. 756.

Primary Examiner—William F. O'Dea
Assistant Examiner—Harold Joyce
Attorney, Agent, or Firm—Fleit & Jacobson

[57] ABSTRACT

Steam curable agglomerates of particulate material are cured by passing steam at elevated temperature and pressure through a bed of such agglomerates in an autoclave. The flow direction of the steam through the bed is periodically reversed, at least during the temperature raising period of the autoclaving process, to reduce the autoclaving time and produce cured agglomerates of substantially uniform quality.

4 Claims, 1 Drawing Figure

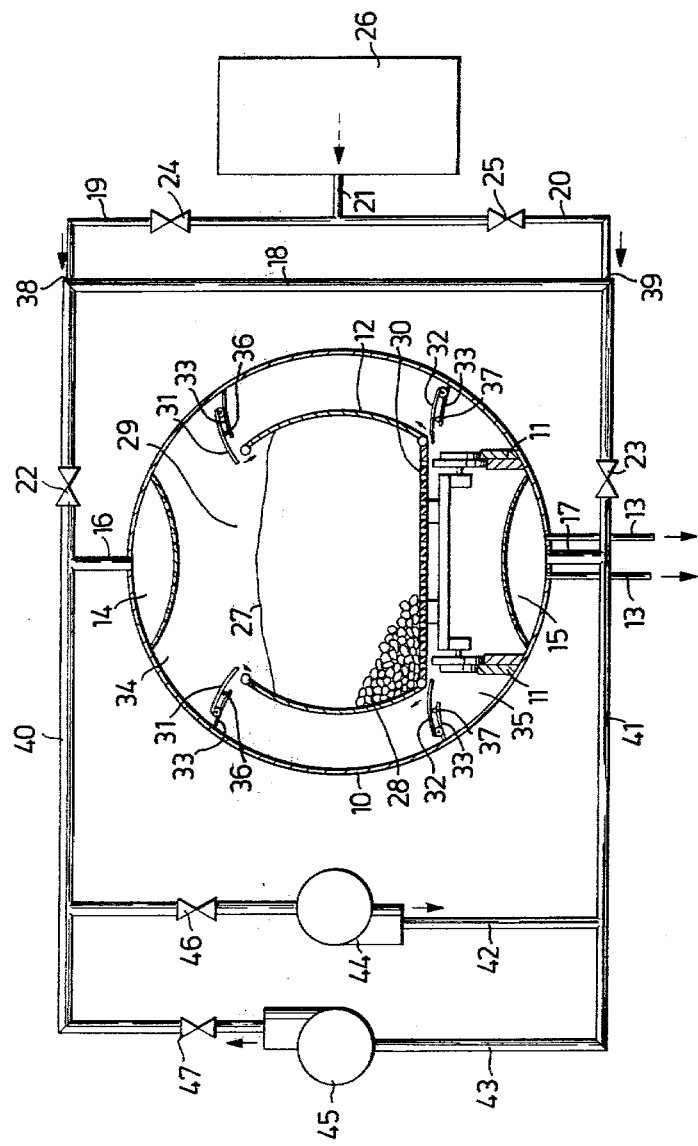

METHOD AND AN APPARATUS FOR STEAM CURING AGGLOMERATES

The present invention relates to a method and an apparatus for curing steam curable agglomerates.

Curing of steam curable agglomerates such as pellets, briquettes and other shaped objects from particulate mineral material has so far normally been carried out by the introduction of water vapor at elevated pressure and temperature into an autoclave containing the agglomerates. The agglomerates are usually carried in a container with openings for allowing passage of steam to or through the container. A drawback from which this procedure suffers is that there is obtained a rather large spread of quality for the cured agglomerates, even if comparatively long autoclaving times are employed. During the initial stage of the autoclaving cycle especially, when the curing medium consisting entirely or at least partly of steam is cooled as it flows forward in the spaces between the agglomerates in the container, there is locally formed a considerable amount of condensate in certain zones of the container, if the curing medium flows through the container in one and the same direction, whereat the agglomerates in these zones can be wetted and fall apart to a certain extent, so that resistance to the flow of the curing medium through the container is increased. There is also a risk that the agglomerates in such zones with reduced permeability as a result of the wetting and disintegration do not attain the temperature required for the curing reaction.

The object of the present invention is to provide a new and improved steam curing method and apparatus whereby said drawback is substantially eliminated.

With this object in view there is proposed, according to the invention, a method of curing steam curable agglomerates, especially pellets and briquettes of particulate mineral material, wherein a gaseous curing medium substantially consisting of steam is passed at elevated pressure and temperature through a bed formed by said agglomerates, and wherein the flow direction of the steam curing medium through the bed is reversed one or more times, at least during the initial stage of the steam curing process. By means of this method there is obtained a quick and effective utilization of the curing medium supplied, and the condensate formation will hereby take place in larger regions of the container with greatly reduced tendences of wetting and disintegraton of the agglomerates as a result, while the likelihood for all agglomerates being quickly reached by the curing medium and thereby substantially uniformly affected by it are strongly increased. Investigations have shown that the autoclaving times when utilizing the method according to the invention can be reduced to about 50–70% of those now in use without reducing the demands on quality, whereby there is obtained a substantially increased 24 hour capacity.

An apparatus for carrying out the method of the invention advantageously comprises an autoclave with openings for passing a gaseous curing medium substantially consisting of steam into and out of the autoclave means, for supplying curing medium from a curing medium source to the autoclave, an agglomerates container which is insertable and withdrawable in and out of the autoclave and is provided with openings to allow the passage of curing medium through the container, a sealing means acting between the inside of the autoclave and the container to at least substantially prevent passage through the autoclave of curing medium supplied thereto other than via the interior of the container, conduit means extending between said autoclave openings, and means for forced feeding curing medium in selective directions through said conduit means.

During the latter portion of the autoclaving cycle, when desired autoclaving temperature has been reached, there is required a comparatively minor new addition of curing medium, for which reason it is preferred that said means for forced feeding curing medium be capable of working independently of the curing medium supply means.

To enable simple and rapid insertion and withdrawal of the container in and out of the autoclave it is preferred to use a sealing means which, with simple hand manoeuvers or automatically, can be brought into engagement or out of engagement with the container or the autoclave. In line herewith, it is proposed, according to the invention, that the sealing means be arranged to seal only at differences in pressures between the autoclave spaces on opposite sides of the sealing means.

A preferred embodiment of the apparatus for carrying out the method of the invention will now be described while referring to the accompanying drawing showing said embodiment schematically and partly in section.

On the drawing, reference numeral 10 designates a substantially cylindrical, tightly-closable steam autoclave with rails 11 for an agglomerate container 12 formed as a carriage and insertable and withdrawable in and out of the autoclave. On outlet for condensate is designated 13. Upper and lower perforated manifolds 14 and 15 extend along the length of the autoclave 10, said manifolds being connectable to a source 26 for gaseous steam-bearing curing medium via conduits 16–21 and valves 22–25.

The container 12, filled to the level 27 with agglomerates 28 to be steam hardened, is provided with an upper opening 29 and a lower opening provided with a grid 30 for retaining the agglomerates and allowing passage of the curing medium through the interior of the container between the agglomerates 28 present therein.

There is further provided a sealing means which prevents passage through the autoclave 10 of the curing medium supplied thereto other than via the interior of the container 12. This sealing means comprises, in the embodiment shown, upper and lower sealing flaps 31 and 32, respectively, carried by the autoclave 10 via holders 33. Corresponding sealing flaps and holders (not shown) are arranged at the end of the container and the end walls of the autoclave. The flaps are arranged for automatically coming into substantially sealing engagement with the container wall edges surrounding the container openings at different pressures in the autoclave spaces 34, 35 on different sides of the sealing means. For this purpose, the sealing flaps are pivotably mounted on the holders 33, whereby the upper and lower flaps 31, 32 are supported in position via compression springs 36 and stops 37 in which they are out of engagement with said container edges, so that the container 12 can be inserted and withdrawn in and out of the autoclave 10 without being hindered by the sealing means. However, at an excess pressure in the autoclave space 34 in relation to the autoclave space 35, the flaps 31 are pressed against the action of the springs 36 into sealing engagement against the upper edges of the container walls, whereas at excess pressure in the autoclave space 35 in relation to the autoclave space 34, the flaps 32 are swung up to sealing engagement against the lower edges of the container wall.

For recycling curing medium which has passed through the container 12 from the autoclave space 35 on the under side of the sealing means 31–33, 36, 37 to the autoclave space 34 on the upper side of the sealing means, the conduit 19 opens out via a nozzle 38 into the conduit 18, said nozzle being so constructed and directed in relation to this conduit that the curing medium flowing out exerts an entraining action on the curing medium in the upstream region of the conduit 18 and thereby via the conduit 17 and manifold 15 creating a suction action in the autoclave space 35. In a corresponding manner, the conduit 20 opens out via a nozzle 39 in the opposite direction of the conduit 18 to create a subpressure in the autoclave space 34. By means of the valves 24, 25 the curing medium is guided to one or the other of the nozzles 38, 39.

To allow flow of the curing medium through the container 12 independent of whether and to what extent the curing medium is newly added through the nozzle 38 or 39, there are arranged further conduits 40–43, blowers 44, 45 or the like and valves 46, 47, the conduits 40, 41 in the embodiment shown each being connected via the conduits 16, 17 and manifolds 14, 15 to their respective one of the autoclave spaces 34, 35. With the valve 46 closed and the valve 47 open, the conduits 41, 43, 40 and the blower 45 are used to circulate curing medium through the autoclave 10 and container 12 in one direction, while the conduits 40, 42, 41 and the blower 44 with the valve 46 open and the valve 47 closed are used for circulating curing medium through the autoclave and container in the other direction. In such circulation of the curing medium without new addition of curing medium through either of the nozzles 38, 39 the valves 22, 23 can be closed. A program unit can be arranged for automatically controlling new addition and circulaton of curing medium as well as reversing the circulation direction of curing medium via the valves and blowers according to a preferred schedule for the agglomerates in question.

A preferred embodiment of the method according to the invention in conjunction with curing of steam curable iron ore pellets is described by way of example in the following.

Iron ore pellets which have been partially dried and preheated to a temperature of about 50° C. are charged into a carriage and inserted into an autoclave essentially of the construction described hereinbefore. Steam at a temperature of about 210° C. and corresponding pressure is passed through the autoclave and the pellet charge accommodated therein. To lessen the shock effect caused by the temperature difference between charge and steam, the flow direction of the steam through the charge is reversed periodically, the time between reversals being advantageously 1–3 minutes, until an average charge temperature of about 150° C. has been attained. Steam curing can subsequently be completed without reversing the steam flow direction, although continued flow direction reversals, e.g., at intervals of about 10 minutes, are preferred, until the maximum autoclaving temperature (governed by the steam temperature) is attained. During the latter part of the temperature raising period, the optional steady temperature maintenance period and temperature reduction period, when cooling gas may be added, a strong gas circulation through the pellet charge is advantageously maintained independently of the steam supply and irrespective of whether there are reversals of steam flow direction.

The invention is naturally not limited to the example described above and shown on the drawing, but the embodiment of the invention can be modified in many ways within the scope of the following claims.

I claim:

1. A method of curing steam-curable agglomerates comprising passing a gaseous curing medium consisting substantially of steam at elevated pressure and temperature substantially vertically through a stationary bed of said agglomerates, the flow direction of said curing medium through said bed of agglomerates being reversed at least one time during the initial stage of the steam curing process when the temperature rises, thereby to prevent excessive wetting of the agglomerates by condensed steam and to reduce the processing time and produce steam cured agglomerates of substantially uniform quality.

2. The method of claim 1 wherein the steam-curable agglomerates are pellets of a particulate mineral material.

3. The method of claim 2 wherein the pellets are iron ore pellets.

4. The method of claim 1 wherein the steam-curable agglomerates are briquettes of a particulate mineral material.

* * * * *

UNITED STATES PATENT AND TRADEMARK OFFICE
CERTIFICATE OF CORRECTION

PATENT NO. : 4,205,455
DATED : June 3, 1980
INVENTOR(S) : PER G. KIHLSTEDT

It is certified that error appears in the above—identified patent and that said Letters Patent is hereby corrected as shown below:

On the title page, insert

-- (30) Foreign Application Priority Data

August 28, 1975 Sweden.................7509560 --.

*Signed and Sealed this*

*Fourth* Day of *November 1980*

[SEAL]

*Attest:*

SIDNEY A. DIAMOND

*Attesting Officer*     *Commissioner of Patents and Trademarks*